Oct. 6, 1931.   A. C. JACK   1,826,316
RAIL FASTENING
Filed March 19, 1931
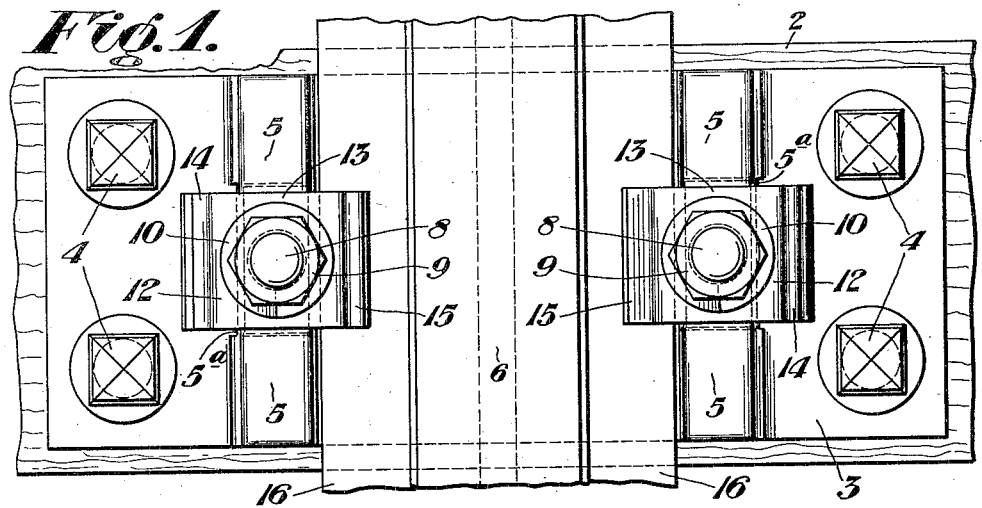
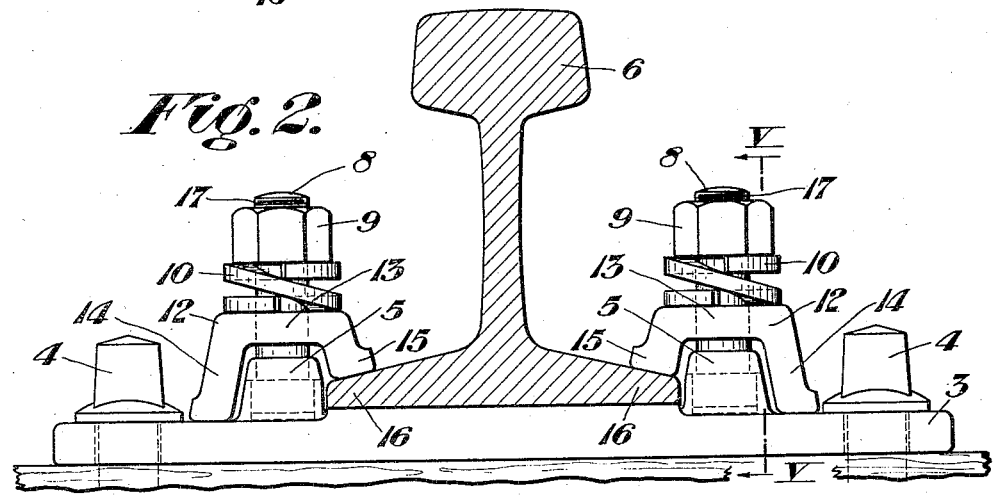
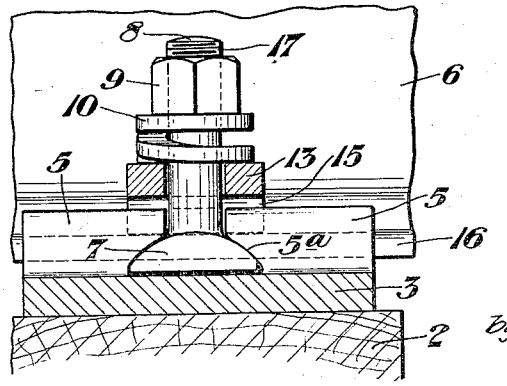
Inventor:
ARTHUR C. JACK,
by: Usina & Rauber
his Attorneys Patented Oct. 6, 1931

1,826,316

UNITED STATES PATENT OFFICE

ARTHUR C. JACK, OF PITTSBURGH, PENNSYLVANIA

RAIL FASTENING

Application filed March 19, 1931. Serial No. 523,819.

This invention relates to rail fastenings and, while not limited thereto, relates more particularly to means for securing rails to tie or sole-plates forming rail seats, and has for one of its objects the provision of a novel fastening of this class which will be elastic under extreme loads.

Another object is to provide a fastening of this class which will have a uniform initial tension applied to the rail through the clamps at all sleepers or ties.

In the drawings:

Figure 1 is a plan view of a section of rail secured to a tie by the fastening of this invention.

Figure 2 is a cross-sectional elevation.

Figures 3 and 4 are elevations of bolts used in the fastening.

Figure 5 is a sectional view taken on the line V—V of Figure 2.

Referring more particularly to the drawings, the numeral 2 designates the sleeper or tie. A tie or sole-plate 3 is fastened by screw spikes 4 to the tie and is provided with rib-like projections 5 between which the rail 6 is mounted. The projections 5 are provided with undercut transverse recesses 5ª to receive the heads 7 of bolts 8 which have nuts 9 on their upper threaded ends bearing through spring washers 10 on clips 12 which hold the rail down.

Each of the clips 12 has a central portion 13 passing over the shank of the bolt 8, an outer leg 14 bearing on the tie-plate 3, and an inner leg 15 bearing on the marginal portion of the base flange 16 of the rail 6.

The bolts 8 have their shanks threaded for a short distance from their unthreaded end, as at 17, and have the remainder of their shanks unthreaded. The threaded portion of the bolt shank is of such length that it leaves a length of unthreaded bolt shank 8 projecting upwardly above the clip 12. The projecting unthreaded portion of bolt shank is of less length than the extended dimension of the spring washer 10 and of greater length than the collapsed dimension of the spring washer.

The bolts 8 may have their threaded end portions 17 of the same diameter as the remainder of the shank, as shown in Figure 3, or may have their threaded portion of a slightly less diameter than the remainder of the bolt shank, as shown in Figure 4, so as to provide a shoulder 20 against which the nuts 9 may be forced.

With either form of bolt the nuts 9 will be preferably threaded to the limit of the threaded portion 17 of the bolt shank, thus providing a uniform tension on all the spring washers 10.

The length of unthreaded bolt shank projecting above the clips 12 will be limited to an amount which will provide for sufficient tension being placed on the spring washers 10 by the nuts 9 to apply an amount of initial pressure to prevent the rail from creeping.

While I have shown my invention as applied to a construction in which a sole or tie-plate is used of suitable dimensions for application to a single tie, it will be understood that I do not wish to be limited to this construction since the same novel features may be used with sole or tie-plates of greater length and used to bridge over two or more ties in forming rail joints.

When rails are joined the abutting ends are located adjacent the center of the tie-plate and suitable splice-bars are mounted along each side of the rail joint to secure the rails together in the usual manner.

When metal, concrete or other than wooden ties are used bolts or other securing means may be substituted for the spikes 4.

Various other modifications may be made by those skilled in the art without departing from the scope of my invention, as defined in the appended claims.

I claim:

1. In a rail fastening having a rail seat with rib-like projections between which the rail can rest, said projections being provided with undercut transverse recesses, clips bestriding said projections and having one leg engaging said rail seat and the other leg positioned to engage the base flange of the rail, bolts for holding down said clips, said bolts having their heads inserted in said transverse recesses in said ribs and having their shanks projecting a material distance above said clips, spring washers mounted around said bolts, said bolts having their upper ends threaded and having an unthreaded portion of shank extending above said clips, said unthreaded portion of bolt shank being of less length than the extended vertical dimension of said springs and of a greater length than the collapsed vertical dimension of said springs, and nuts threaded on the upper threaded ends of said bolts to the limit of the threads to tension said spring washers uniformly.

2. In a rail fastening having a rail seat on which the rail can rest and a clip having one leg engaging said rail seat and the other leg positioned to engage the base flange of the rail, a bolt for holding down said clip, said bolt having its head engaged with said rail seat and having its shank projecting through and a material distance above said clip, a spring washer mounted around said bolt, said bolt having its upper end threaded and having an unthreaded portion of shank extending above said clip, said unthreaded portion of bolt shank being of less length than the extended vertical dimensions of said spring and of greater length than the collapsed vertical dimension of said spring, and a nut threaded home on said bolt to tension said spring.

3. In a rail fastening having a rail seat on which the rail can rest, means for clamping the rail in position, said means including a rail engaging clip, a bolt secured to said rail seat and projecting through said clip, a coiled spring washer mounted around said bolt above said clip, said bolt having its upper end threaded and having an unthreaded portion of its shank above said clip of less length than the extended dimension of said spring washer and a greater length than the collapsed dimension of said washer, and a nut threaded home on said threaded end of said bolt to tension said spring.

4. In a rail fastening having a rail seat on which the rail can rest, means for clamping the rail in position, said means including a rail engaging clip, a bolt secured to said rail seat and projecting through said clip, a coiled spring washer mounted around said bolt above said clip, said bolt having its upper end threaded and having an unthreaded portion of its shank above said clip of less length than the extended dimension of said spring washer and a greater length than the collapsed dimension of said washer, said unthreaded portion of said bolt shank terminating in a shoulder, and a nut threaded on said threaded end and abutting said shoulder to tension said spring.

5. In a rail fastening having a rail seat on which the rail can rest, means for clamping the rail in position, said means including a rail engaging clip, a bolt removably secured to said rail seat and projecting through said clip, a coiled spring washer mounted around said bolt and seated on top of said clip, said bolt having its upper end threaded and having an unthreaded portion of shank projecting above said clip of lesser length than the extended dimension of said spring washer and of a greater length than the collapsed dimension of said spring washer, said threaded upper end of said bolt being of less diameter than the unthreaded portion of said bolt shank and terminating at its lower end in a shoulder, and a nut threaded on said threaded end of said bolt shank and tightened against said shoulder to tension said spring washer to a predetermined degree determined by the length of unthreaded bolt shank above said clip.

In testimony whereof, I have hereunto set my hand.

ARTHUR C. JACK.